April 9, 1968  H. W. MEYER ETAL  3,377,158
CONVERTER CONTROL SYSTEMS AND METHODS
Filed April 28, 1965

INVENTORS
Harry W. Meyer,
W. Fergus Porter &
Melvin M. Fischer

April 9, 1968     H. W. MEYER ETAL     3,377,158
CONVERTER CONTROL SYSTEMS AND METHODS
Filed April 28, 1965

INVENTORS
Harry W. Meyer,
W. Fergus Porter &
Melvin M. Fischer

3,377,158
CONVERTER CONTROL SYSTEMS AND METHODS

Harry W. Meyer and W. Fergus Porter, Mount Lebanon Township, Allegheny County, and Melvin M. Fischer, Castle Shannon, Pa., assignors to Jones & Laughlin Steel Corporation
Filed Apr. 28, 1965, Ser. No. 451,523
8 Claims. (Cl. 75—60)

ABSTRACT OF THE DISCLOSURE

The method of controlling the refining of a bath of iron of known weight by the steps of continuously measuring the content of carbon and oxygen compounds in the waste gas per unit of time and the amount of oxygen blown per unit of time and continuously determining from these two measurements the carbon oxidation rate by dividing the measured carbon content of the waste gas per unit of time by the amount of oxygen blown, retrieving from previous values of bath carbon the values of carbon and oxygen rate corresponding to the determined rate thereby establishing a relation between bath carbon and carbon oxidation and thereafter determining the quantity of oxygen required to reduce a value of bath carbon so determined to a desired final value by integrating the relation between bath carbon and carbon oxidation rate from that value of bath carbon to the desired final value and blowing the bath with that quantity of oxygen.

---

This invention relates to converter control systems and methods and particularly to a system and method for dynamic control of the carbon content and temperature of the steel bath in a top blown oxygen steelmaking converter such as the basic oxygen furnace.

In the operation of a top blown oxygen converter, the problems of control of temperature, chemistry of the metal and slag and time are vastly magnifed over previously used steelmaking apparatus and methods. For example, the entire process of refinement in such a converter is carried out in a matter of minutes compared with hours in the open hearth method of steelmaking. As a result of this vastly shortened time period of treatment, it is not practical to stop the blow, rotate the furnace and remove samples periodically from the bath and perform chemical analyses on the metal. Neither is it practical to stop the blow and rotate the furnace to make periodic temperature checks on the molten bath. The time honored control techniques of ordinary steel-making processes of the past are thus not adapted to the top blown oxygen converter. It has become essential in order to take the most advantages from the oxygen converter, to discard such techniques and to provide some means of control which eliminates the need to stop the blow and tilt the furnace to remove samples for carbon and other chemistry control or for determinations of bath temperature or other conditions which affect the ultimate character of the finished metal.

We have discovered certain control systems and methods which eliminate the need to stop the blow, particularly near the end of the heat, for the purpose of determining the carbon content, temperature and other significant characteristics of the bath. By our system and method, the time per heat is reduced and the maximum potential of the top blown oxygen converter achieved.

We preferably provide a method of controlling the refining of a bath of iron of known weight by blowing it with oxygen containing gas comprising the steps of measuring the content of carbon and oxygen compounds including water in the waste gas for a given period of time, measuring the amount of oxygen blown during the same period of time, calculating from the preceding two measurements a carbon oxidation rate, establishing a curve of carbon oxidation rate versus carbon from said carbon oxidation rate and a point of zero carbon oxidation rate established by extrapolating the said carbon oxidation rate versus carbon from previous blows together with at least one curve of carbon oxidation rate versus carbon from previous blows, approximating the quantity of carbon in the bath at the end of said period and feeding the quantity of oxygen required to reduce the quantity of carbon to the desired final carbon content. Preferably the final temperature may be fixed by measuring the temperature of the bath at a preselected point in the blow, establishing the temperature rise resulting from feeding the oxygen required to reach the desired carbon content, calculating the resulting final temperature and adjusting the addition of oxygen and the addition of coolants to control the temperature. Preferably the temperature is controlled by raising the oxygen lance level where the bath temperature is too cold or adding coolant, e.g., limestone, dolomite, ore, scrap, etc., where the bath temperature is too hot. In a preferred practice of our invention the operation of the furnace is controlled by a computer into which the necessary data is fed as determined.

The practice of our invention can perhaps be best understood by reference to the accompanying drawings and to the following examples. In the drawings, FIGURE 1 is a diagrammatical showing of an apparatus for carrying out our invention;

Figure 1:
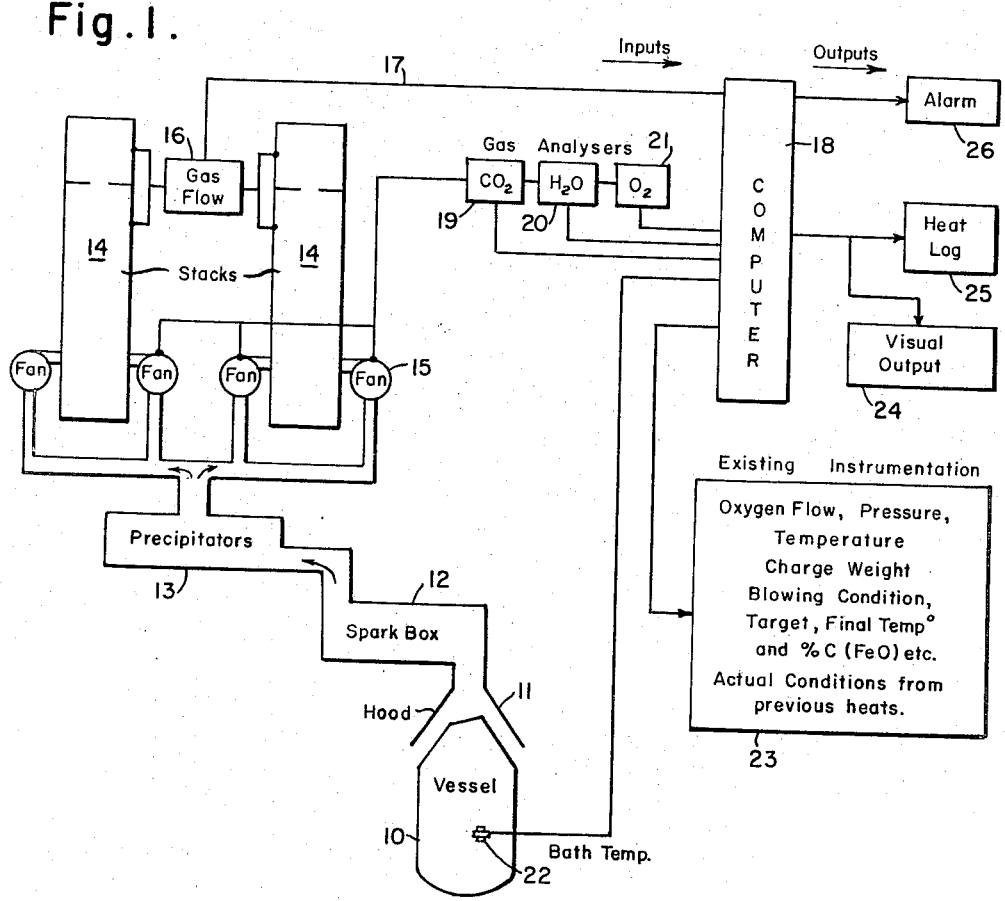

In the drawings, we have illustrated a basic oxygen furnace 10 of conventional design provided with a hood 11, spark box 12, precipitators 13, stacks 14 and blowers 15. A gas flow meter 16 is provided on stacks 14 to measure the rate of gas flow. This rate is fed by line 17 to computer 18. Gas analyzers 19, 20 and 21 are used for determining the $CO_2$, $H_2O$ and $O_2$ content of the waste gases. The results of the analyses are fed to computer 18. A bath temperature is determined by an appropriate thermocouple 22 and fed to computer 18. Conventional instrumentation shown as box 23 is provided for automatically feeding to computer 18 the oxygen flow rate, pressure and temperature and for manually or automatically feeding the determined blowing conditions such as target temperature and target carbon. The computer 18 feeds the final data to a visual instrument panel 24, a heat log 25 and an alarm 26.

In the preferred practice of our invention, we establish the functional relationship for the furnace between the carbon-oxidation rate $\varphi$ and the bath carbon content. The term carbon-oxidation rate is determined by dividing the units of carbon leaving the bath in a given time interval by the volume of oxygen which flows through the lance during the same time period. In order to calculate the carbon-oxidation rate $\varphi$ it is necessary to measure the following quantities:

Oxygen composition and flow through the lance.
Waste gas flow rate.
Waste gas composition, in particular carbon-oxygen compounds and moisture.
Weights of materials charged to the furnace; it being not necessary to know the carbon content of the charge.

The preferred form of the functional relationship between the carbon-oxidation rate and the carbon content of the bath is as shown in Equation 1.

$$\varphi = \alpha + \beta * \exp(\gamma * C) \quad (1)$$

where:

$\varphi$ is the carbon oxidation rate in percent C/c.f. of oxygen
$\alpha, \beta,$ and $\gamma$ are parameters
C is the percent C in the bath.

Figure 2:
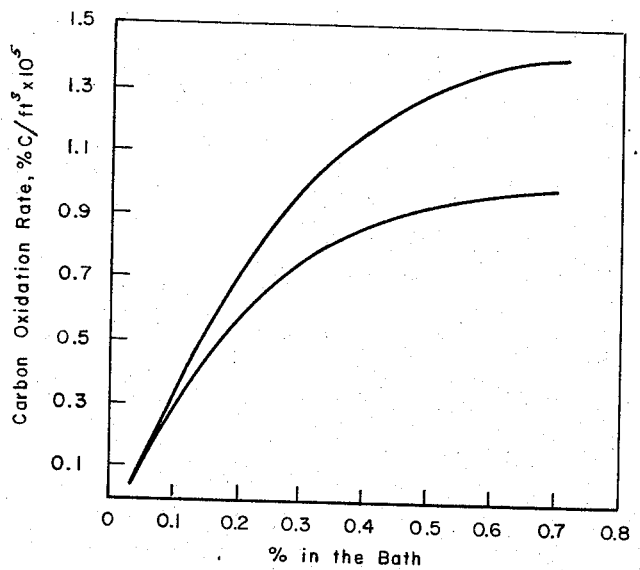
FIGURE 2 is a typical curve of maximum and minimum decarburization rate versus carbon.

A graph showing typical curves of carbon-oxidation rate to carbon content of the bath is given in FIGURE 2, it being understood that between these curves lie an infinite series of possible refining curves of the same general form. The curves shown demonstrate the upper and lower limits for a particular furnace and practice, and these boundaries will vary depending on the furnace and operating practice involved. With the preferred Equation 1, which is expressed in three parameters, $\alpha, \beta, \gamma,$ we can describe any function of the type shown in FIGURE 1 by varying the numerical values of the parameters.

In order to use our method of control it is necessary to determine which carbon oxidation/carbon content curve is being followed during the progress of refining.

By integrating Equation 1, a value is obtained for the volume of oxygen necessary to reduce the carbon content of the bath to the desired final concentration. Before the integration can be performed, however, it is necessary to know the actual carbon content at the moment of integration. A technique has been developed to estimate the carbon in the bath by analyzing the carbon-oxidation rate versus carbon curve.

Figure 3:
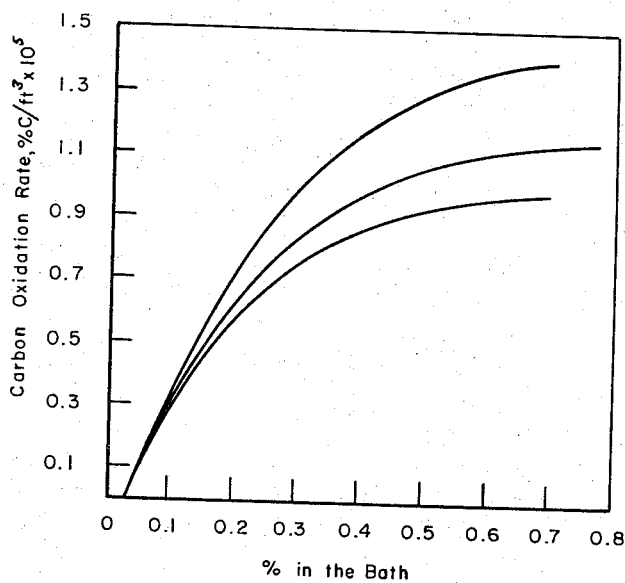
FIGURE 3 shows the curves of FIGURE 2 applied to the prediction of a specific oxidation rate versus carbon curve.

From FIGURE 3 it can be seen that as the various possible carbon-oxidation rate carbon curves progress through a set carbon-oxidation band (for example, $$-0.9 \times 10^{-5}$$

to $-0.7 \times 10^{-5}$ percent C/c.f. of oxygen), varying quantities of carbon may be removed. Thus if a carbon integral is started when the curve reaches a certain carbon-oxidation level ($-0.9$) and continued until a second level is reached ($-0.7$), determination of the quantity of carbon removed ($\Delta C$) in this time increment indicates the carbon level in the bath. An empirical relationship has been developed linking $\Delta C$ with the carbon concentration at $\varphi = -0.7$. Once the carbon level has been determined and by assuming that all curves will pass through the same point when the carbon oxidation rate is zero, unique values of $\alpha, \beta, \gamma,$ are calculated for the heat being controlled and integration of the equation can be performed to find the quantity of oxygen which must be blown to reach the desired final bath carbon concentration.

The operation of our invention is exemplified by the following heats of steel.

EXAMPLE I

A basic oxygen furnace was charged with the following charge of materials:

|  | Wt., lbs. | Si, Percent | Mn, Percent | Temp., °F. |
|---|---|---|---|---|
| Hot metal | 325,000 | 1.2 | 0.76 | 2,550 |
| Scrap | 189,000 |  |  |  |
| Burnt lime | 26,000 |  |  |  |
| Burnt dolomite | 6,000 |  |  |  |
| Fluorspar | 2,000 |  |  |  |

The desired final tap carbon was established at 0.050%.

Based upon the characteristic shape of carbon oxidation rate versus carbon plots observed with the furnace over a period of time, the following expression was postulated to describe the oxidation rate-carbon concentration relation.

$$dC/(dt*q1) = \alpha + \beta * \exp(\gamma * C)$$

The oxygen for carbon equation follows directly from this equation and if the equation be solved for Q1 (the total oxygen required) by integration between the current carbon level and the desired target level, the following expression results.

$$Q1 = \int dt * q1$$
$$Q1 = (CF - C)/\alpha + 1/\alpha*\gamma) * \log [\alpha + \beta * \exp(\gamma*C)]/[\alpha + \beta * \exp(\gamma*CF)]$$

where $Q1$ = oxygen required to reach target carbon level (s.c.f.)
$CF$ = target carbon level (percent)
$C$ = current carbon level (percent)
$q1$ = oxygen flow rate (s.c.f./min.)

A graph showing the maximum and minimum curves of carbon oxidation rate ($dC/dt*q1$) to carbon (C) for the furnace was prepared. These two curves represent the limits of experience for the furnace. Such a curve is shown in FIGURE 2 as already described. Between the two curves of maximum and minimum carbon oxidation versus carbon lie a series of possible refining curves which almost overlap each other. The curve of any heat for the furnace will lie within these limits. In the following heat logs the terms $\alpha', \beta'$ and $\gamma'$ refer to tentative values awarded to the parameters appearing in the Equation 1 set out above before the actual determination of carbon is made.

Based upon the foregoing assumption, the heat log of this example is as follows:

HEAT LOG AND COMPUTER ACTIVITIES
(The Concentration of Carbon is Determined on Basis of the Relationship Between $\Delta C$ and $C)^2$

| Time | Operation Variable | Event | Computer Activity |
|---|---|---|---|
| 0'00" | (1) Oxygen on. Flow Rate=13,000 s.c.f.m.<br>(2) Lance Height=100". |  | (1) 12 sec. scan of analog signals.<br>(2) Commence oxygen sum. |
| 5'00" | (1) Lance lowered to 50". |  |  |
| 15'00"<br>17'00" | (1) Oxygen flow rate increased to 16,000 s.c.f.m. | (1) Oxygen blown=220,000 s.c.f. | (1) Specific decarburization rates ($\varphi$) calculated and stored.<br>(2) Integral carbon balance gives relative carbon values. |
| 21'36" |  | (1) Oxygen blown=300,000 s.c.f. | (1) Bomb thermocouple called. |
| 22'12" | (1) Bomb thermocouple dropped→2,770° F. | (1) Oxygen blown=310,000 s.c.f. |  |
| 22'48" |  | (1) $\varphi=-.905$. |  |
| 23'00" | (1) Actually 47,400 s.c.f. blown till end of heat. | (1) $\varphi=-.829$. | (1) $\alpha', \beta'$ and $\gamma'$ calculated in initial attempt to describe course of heat.<br>(2) Difference in carbon concentrations between $\varphi=-0.9$ and $\varphi=-0.7$ calculated ($\Delta C$).<br>(3) Actual carbon concentration at $\varphi=-0.7$ determined from $\Delta C$ vs. C relationship.<br>(4) Actual $\alpha, \beta$ and $\gamma$ values to uniquely describe heat course calculated. |
|  |  | (2) $C_{on1}(\varphi=-.829)=.317\%$. | (5) Function integrated between carbon level of .317% and carbon level of .049%. |
|  |  | (3) Blow further 47,300 s.c.f. | (6) Rate of increase of temperature calculated. |
|  |  | (4) No corrective action called for. | (7) Temperature effect of 47,300 s.c.f. calculated. Predicted final temperature=2,917° F.<br>(1) Request end of blow. |
| 26'09"<br>26'10" | (1) Oxygen blow stopped.<br>Bath temperature=2,910° F.<br>Carbon concentration=.049%. |  |  |

Example II

A basic oxygen furnace was charged with the following charge of materials:

|              | Wt., lbs. | Si, Percent | Mn, Percent | Temp., °F. |
|---|---|---|---|---|
| Hot Metal #1 | 64,000 | 0.88 | 0.68 | |
| Hot Metal #2 | 284,000 | 1.02 | 0.71 | 2,440 |
| Scrap | 164,000 | | | |
| Burnt lime | 23,000 | | | |
| Burnt dolomite | 6,000 | | | |
| Fluorspar | 2,200 | | | |

The desired final tap carbon was established at 0.050%. The heat log of this example is as follows:

reference to the following examples illustrating the technique to be followed.

Example III

A basic oxygen furnace was charged with the following materials:

|              | Wt., lbs. | Si, Percent | Mn, Percent | Temp., °F. |
|---|---|---|---|---|
| Hot Metal 1 | 325,000 | 1.27 | 0.76 | 2,550 |
| Hot Metal 2 | | | | |
| Scrap | 189,000 | | | |
| Burnt Lime | 26,000 | | | |
| Burnt Dolomite | 6,000 | | | |
| Fluorspar | 2,000 | | | |
| Desired Tap carbon | .050% | | | |

HEAT LOG AND COMPUTER ACTIVITIES
(The Concentration of Carbon is Determined on Basis of the Relationship Between $\Delta C$ and $C)^2$

| Time | Operation Variable | Event | Computer Activity |
|---|---|---|---|
| 0'00" | (1) Oxygen on. Flow Rate=13,000 s.c.f.m<br>(2) Lance Height=70" | | (1) 12 sec. scan of analog signals.<br>(2) Commence oxygen sum. |
| 6'00" | (1) Lance lowered to 50". | | |
| 15'00" | (1) Oxygen flow rate increased to 16,000 s.c.f.m. | | |
| 16'36" | | (1) Oxygen blown=220,000 s.c.f. | (1) Specific decarburization rates ($\varphi$) calculated and stored.<br>(2) Integral carbon balance gives relative carbon values. |
| 21'20" | | (1) Oxygen blown=300,000 s.c.f.<br>(1) $\varphi = -.911$. | (1) Bomb thermocouple called. |
| 22'00" | | (1) Oxygen blown=314,000 s.c.f. | |
| 22'12" | (1) Bomb thermocouple dropped →2,825° F.<br>(2) Actually 58,200 blown till end of heat. | (2) $\varphi = -.859$.<br><br>(3) $C_{cal}$ ($\varphi = -.859$) = .309%.<br>(4) Blow further 59,300 s.c.f.<br>(5) 2,000 lbs. of limestone requested as coolant. | (1) $\alpha'$, $\beta'$, and $\gamma'$ calculated in initial attempt to describe course of heat.<br>(2) Difference in carbon concentrations between $\varphi = -0.9$ and $\varphi = -0.7$ calculated ($\Delta C$).<br>(3) Actual carbon concentration at $\varphi = -0.7$ from $\Delta C$ vs. C relationship.<br>(4) Actual $\alpha'$, $\beta$ and $\gamma$ values to uniquely describe heat course calculated.<br>(5) Function integrated between carbon level of .309 % and carbon level of .049%.<br>(6) Rate of increase of temperature calculated.<br>(7) Temperature effect of 59,300 s.c.f. calculated; predicted final temperature=2,950° F. |
| 23'12" | (1) Probable time of limestone addition. | | |
| 26'06" | (1) Oxygen blow stopped.<br>Bath temperature=2,948° F. | | |
| 26'10" | Carbon concentration=.049%. | | (1) Request end of blow. |

It will be seen from the foregoing examples that the actual carbon was 0.049% against a desired carbon of 0.050%. It is obvious that this difference is well within the area of analytical error. It will also be noted that the temperatures were reasonably close to that desired. In Example I the final temperature was 7° F. less than desired. In Example II the final temperature was within 2° F. of that calculated by the computer if no control action was taken. The addition of 2000 lbs. of limestone as recommended by the computer at 23 minutes 12 seconds would have resulted in a final temperature close to the desired 2920° F.

A second method of determining $\alpha$, $\beta$ and $\gamma$ which is the preferred method for higher final bath carbon levels, for example above 0.25%, C, is a technique referred to as the linear ratio method. In this technique we establish the particular value of the model parameters ($\alpha$, $\beta$, $\gamma$) for the heats being controlled by a technique of parameter estimation via a reference model. The principle of the technique is outlined in FIGURE 4. $\alpha_O$ is the asymptote of the average carbon oxidation rate versus carbon curve for a particular set of heats. It is determined by storing and averaging the value of $\alpha$ for each of a selected number of previous heats; e.g., the previous 20 or 30 heats.

For the particular heat being controlled $\alpha_H$ is calculated by averaging the carbon-oxidation values observed over a short period of time (two or three minutes) after a certain volume of oxygen has been blown (1000 s.c.f. per ton of charge). By comparing $\alpha_H$ with $\alpha_O$, it is possible to predict a value of $\varphi$ corresponding to a preselected value of C. It is assumed that all curves will pass through a point when the carbon oxidation rate is zero. By this means the unique values of $\alpha_H$, $\beta_H$, $\gamma_H$ can be calculated for the heat being controlled. Once these have been determined, integration is performed to calculate the required volumes of oxygen to produce the desired final carbon concentration.

This second method will be more fully understood by reference to the following examples illustrating the technique to be followed.

Figure 4:
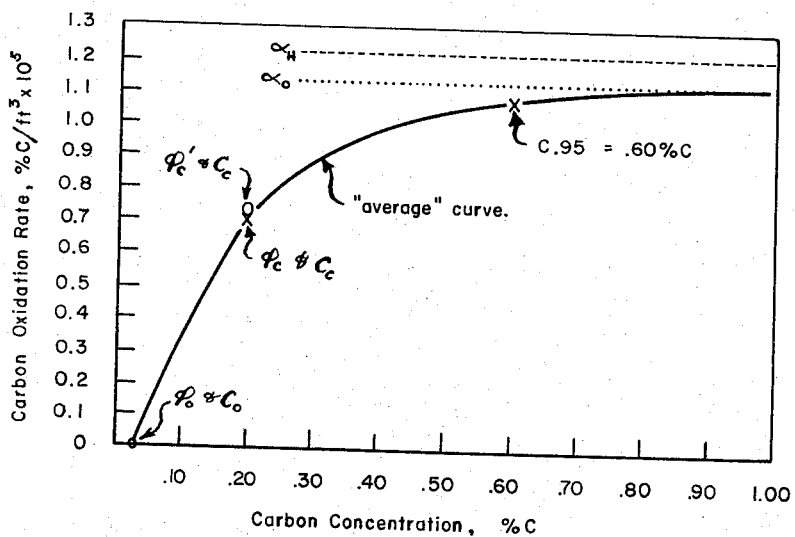
FIGURE 4 is a curve of average decarburization rate versus carbon showing the asymptote of the average curve and the asymptote of a specific curve.

The principle of this second method is outlined in FIGURE 4. $\alpha_O$ is the asymptote of the average specific decarburization versus carbon curve for a particular set of heats. It is determined by storing and averaging the value of $\alpha$ for each of the previous selected group of heats.

For the particular heat being controlled, $\alpha_H$ is calculated by averaging the specific decarburization values observed over a period of 3 minutes after a certain volume of oxygen has been blown, for example, 1000 s.c.f./ton of charge. In the example illustrated in FIGURE 4, $\Delta \alpha = \alpha_H - \alpha_O$.

$\varphi_C$ is determined for the particular set of heats by averaging the carbon oxidation rates observed at a constant concentration of carbon $C_C$. In FIGURE 4, $$\varphi_C = -0.70 * 10^{-5}$$

at a carbon value of .20%. The individual value $\varphi$ at $C_C$ for each heat is determined and stored after the heat is completed, and the accurate values of $\alpha_H$, $\beta_H$ and $\gamma_H$ have been calculated.

$C_{.95}$ is determined by averaging the carbon concentrations which correspond to a specific decarburization rate of $0.95 * \alpha_H$. The individual value is also determined and stored after each heat is completed.

Similarly, $C_O$ the average carbon concentration of a carbon oxidation rate of 0.0 is determined by extrapolation after the heat is completed. In controlling a heat, the following steps are necessary:

(1) Calculate $\alpha_H$—unique value for particular heat.
(2) $\Delta \alpha = \alpha_H - \alpha_O$
(3) $\Delta \varphi = \Delta \alpha [(C_C - C_O / C_{.95} - C_O)]$
(4) $\varphi_C'$ for a particular heat $= \varphi_C + \Delta \varphi$.

Thus, since (1) $\alpha_H$ is known; (2) $\varphi_C'$ and $C_C$ are known; and (3) $\varphi_O$ and $C_O$ are known, it is possible to calculate values for $\beta_H$ and $\gamma_H$ to describe the course of a heat.

Four pieces of information are stored after each heat.

(1) The value of $\alpha$ for the heat.
(2) The carbon concentration when the specific decarburization rate $(=0.95*10^{-5})*\alpha$.
(3) The specific decarburization rate corresponding to a constant carbon concentration, for example 0.20% carbon.
(4) The carbon concentration corresponding to the specific decarburization rate=0.0.

The heat log of Example III is as follows:

At the time the initial estimation of oxygen requirements to achieve the desired final carbon are made, the temperature of the bath is measured. The final temperature produced by the oxygen volumes required for carbon is calculated and corrective action determined in the light of this final temperature. For example, if it is realized that the oxygen requirements for carbon will result in a too high a final temperature, the required quantities of coolant can be added prior to the end of the heat. Alternatively if the final temperature will be too low, extra volumes of oxygen can be blown over and above

HEAT LOG AND COMPUTER ACTIVITIES (EXAMPLE III)
(Computer Calculations Based on Linear Ratio Technique)

| Time | Operation Variable | Event | Computer Activity |
|---|---|---|---|
| 0′00″ | (1) Oxygen on. Flow Rate=31,000 s.c.f.m. (2) Lance Height=70″. | | (1) 12 sec. scan of analog signals. (2) Commence oxygen sum. |
| 6′00″ | (1) Lance Lowered to 50″. | | |
| 15′00″ | (1) Oxygen flow rate increased to 16,000 s.c.f.m. | (1) Oxygen blown=220,000 s.c.f. | (1) Specific decarburization rates ($\varphi$) calculated—next 15 stored. |
| 16′36″ | | (1) Oxygen blown=271,000 s.c.f. | (1) 15 values of $\varphi$ averaged →value of $\alpha$ for heat. (2) $\alpha-\alpha_0=\Delta\alpha$. |
| 19′48″ | | | (3) $\Delta\alpha\rightarrow\Delta\varphi$. (4) At C=.20%, $\varphi=\varphi_0+\Delta\varphi$. (5) Values for $\alpha, \beta$ and $\gamma$ describing actual heat calcuated. (6) Oxygen requirements calculated to reach .049% C. N.B. Not outputted till <60,000 s.c.f. |
| 21′20″ | | (1) Oxygen blown=300,000 s.c.f. | (1) Bomb thermocouple called. (1) Oxygen requirements=57,000. |
| 21′48″ | (1) Actually 65,000 s.c.f. blown till .049% C. | (1) Oxygen blown=314,000 s.c.f. (2) 1,000 lbs. of limestone requested as coolant. | (1) Rate of increase of temperature calculated. (2) Temperature effect of oxygen requirements calculated; predicted final temperature=2,933° F. |
| 22′12″ | (1) Bomb thermocouple dropped →2,825° F. | | |
| 23′12″ | (1) Probable time of stone addition. | | (1) Request end of blow. |
| 25′36″ | | | (1) Actural values of $\alpha, \beta$ and $\chi$ calculated for heat once all $\varphi$ and C points known. |
| 26′06″ | (1) Oxygen blow actually stopped. Bath temperature=2,948° F. Carbon concentration=.049%. | | (2) Information stored—<br>(a) $\alpha$ for heat<br>(b) Carbon concentration when $\varphi=0.95\times\varphi$.<br>(c) $\varphi$ when carbon concentration=0.20%.<br>(d) Carbon concentration when $\varphi=0.0$. |

Example IV

A basic oxygen furnace was charged with the following materials:

| | Wt., lbs. | Si, Percent | Mn, Percent | Temp., °F. |
|---|---|---|---|---|
| Hot Metal #1 | 64,000 | 0.88 | 0.68 | |
| Hot Metal #2 | 284,000 | 1.02 | 0.71 | 2,440 |
| Scrap | 164,000 | | | |
| Burnt Lime | 23,000 | | | |
| Burnt Dolomite | 6,000 | | | |
| Fluorspar | 2,200 | | | |

The heat log is as follows:

those required to produce the desired final carbon concentration. Should these volumes of oxygen be such as to cause excess decarburization and thus result in the heat being completed with too low a final carbon concentration, the extra volumes of oxygen necessary for temperature can be blown through the lance in a raised position. By this means excess decarburization can be avoided.

The techniques of calculating the temperature of the bath produced by the oxygen volumes required to produce the desired final carbon can be made by a heat bal-

HEAT LOG AND COMPUTER ACTIVITIES (EXAMPLE IV)
Computer Calculations Based on Linear Ratio Technique

| Time | Operation Variable | Event | Computer Activity |
|---|---|---|---|
| 0′00″ | (1) Oxygen on. Flow Rate=13,000 s.c.f.m. (2) Lance Height=100″. | | (1) 12 sec. scan of analog signals. (2) Commence oxygen sum. |
| 5′00″ | (1) Lance lowered to 50″. | | |
| 15′00″ | (1) Oxygen flow rate increased to 16,000 s.c.f.m. | (1) Oxygen blown=220,000 s.c.f. | (1) Specific decarburization rates ($\varphi$) calculated—next 15 stored. |
| 17′00″ | | (1) Oxygen blown=275,000 s.c.f. | (1) 15 values of $\varphi$ averaged→value of $\gamma$ for heat. (2) $\alpha-\alpha_0=\Delta\alpha$. |
| 20′12″ | | | (3) $\Delta\alpha\rightarrow\Delta\varphi$. (4) At C=.20%, $\varphi=\varphi_0+\Delta\varphi$. (5) Values for $\alpha, \beta, \gamma$ describing actual heat calculated. (6) Oxygen requirements calculated to reach .049% C. |
| 21′36″ | | (1) Oxygen blown=300,000 s.c.f. | (1) Bomb thermocouple called. (1) Rate of increase of temperature calculated. |
| 22′12″ | (1) Bomb thermocouple dropped→2,770° F. | (1) Oxygen blown=310,000 s.c.f. | (1) Oxygen requirements=48,800 s.c.f. |
| 22′48″ | (1) Actually 50,800 s.c.f. blown till end of heat. | (1) No corrective action requested. | (2) Temperature effects of oxygen requirements calculated; Predic. final temperature=2,912° F. |
| 26′04″ | | | (1) Request end of blow. (1) Actual values for $\alpha, \beta$ and $\gamma$ calculated for heat once all $\phi$ and C points known. |
| 26′10″ | (1) Oxygen blow stopped. Bath temperature=2,910° F. Carbon Concentration=.049%. | | (2) Information stored—<br>(a) $\alpha$ for heat.<br>(b) carbon concentration when $\varphi=0.95\times\alpha$.<br>(c) $\varphi$ when carbon concentration=0.20%.<br>(d) carbon concentration when $\varphi=0.0$. | ance calculation or by assuming that the temperature increase will be proportional to the volume of oxygen blown.

The variable heat losses due to the varying quantities of unmelted scrap in the BOF constitute the largest intangible factor in the process. An indication of the presence of late melting scrap could be given by the temperature measured at a pre-selected point in each heat. For example, in a 216 ton heat when 340,000 cubic feet of oxygen have been blown, it is found that normally bath temperature of the order of 2825° F. is measured. It is assumed that any heat which displays a temperature of the order of 2860° F. or more has late melting scrap present and thus exhibits a smaller rate of temperature increase than those heats without late melting scrap.

The form of the equation used for calculating the end point temperature is as follows:

$$T_{Final} = T_{Blow} + (K_1 - K_2 * T_{Blow}) * OXB$$

$T_{Final}$=Final temperature of the steel bath at end of the oxygen blow.

$K_1$ and $K_2$=are constants in the equation.

$T_{Blow}$=Temperature of the steel bath at the temperature measured during the blow.

$OXB$=Volume of oxygen blown between the temperature measurement and the end of the blow.

In the foregoing specification, we have set out certain preferred practices of our invention. It will be understood, however, that this invention may be otherwise embodied within the scope of the following claims.

We claim:

1. A method of controlling the refining of a bath of iron of known weight by blowing it with oxygen containing gas comprising the steps of determining the parameters of oxidation rate to carbon from a series of previous blows, measuring the content of carbon and oxygen compounds in the waste gas for a given period of time, measuring the amount of oxygen blown during the same period of time, determining from the preceding two measurements a carbon oxidation rate, determining a value for carbon oxidation rate to carbon from said carbon oxidation rate and from the parameters of oxidation rate to carbon previously determined from previous blows, determining the approximate quantity of carbon in the bath at the end of said period from said value of carbon oxidation rate to carbon and feeding the quantity of oxygen required to reduce the carbon in the bath to the desired final carbon content.

2. A method of controlling the refining of a bath of iron of known weight by blowing it with oxygen containing gas comprising the steps of determining the parameters of oxidation rate to carbon from a series of previous blows, measuring the content of carbon and oxygen compounds in the waste gas for a given period of time, measuring the amount of oxygen blown during the same period of time, determining from the preceding two measurements a carbon oxidation rate, determining a value for carbon oxidation rate to carbon from said carbon oxidation rate and from the parameters of oxidation rate to carbon previously determined from previous blows, determining the approximate quantity of carbon in the bath at the end of said period from said value of carbon oxidation rate to carbon, measuring the temperature in the bath at a preselected point in the blow, determining the temperature rise resulting from feeding the oxygen required to reach the desired carbon level and the final temperature resulting from said rise, feeding the quantity of oxygen required to reduce the carbon in the bath to the desired final carbon and adjusting the level of addition of oxygen and the addition of coolants to control the temperature at a desired level.

3. A method of controlling the refining of a bath of iron of known weight by blowing it with oxygen containing gas comprising the steps of determining the parameters of oxidation rate to carbon from a series of previous blows, substantially continuously automatically measuring the content of carbon and oxygen compounds in the waste gas for a given period of time, substantially continuously automatically measuring the amount of oxygen blown during the same period of time, substantially continuously determining from the preceding two measurements a substantially continuous carbon oxidation rate, determining a substantially continuous series of values of carbon oxidation rate to carbon from said carbon oxidation rate and from the parameters of oxidation rate to carbon previously determined from previous blows, determining the quantity of carbon in the bath at the end of said period from said values of carbon oxidation rate to carbon, and feeding the quantity of oxygen required to reduce the carbon in the bath to the desired final carbon content.

4. A method of controlling the refining of a bath of iron of known weight by blowing it with oxygen containing gas comprising the steps of determining the parameters of oxidation rate to carbon from a series of previous blows, substantially continuously automatically measuring the content of carbon and oxygen compounds in the waste gas for a given period of time, substantially continuously automatically measuring the amount of oxygen blown during the same period of time, substantially continuously determining from the preceding two measurements a substantially continuous carbon oxidation rate, determining a substantially continuous series of values of carbon oxidation rate to carbon from said carbon oxidation rate and from the parameters of oxidation rate to carbon previously determined from previous blows, determining the quantity of carbon in the bath at the end of said period from said values of carbon oxidation rate to carbon, measuring the temperature at a preselected point in the blow, determining the temperature rise resulting from feeding the oxygen required to reach the desired carbon level, and the final temperature resulting from said rise, feeding the quantity of oxygen required to reduce the carbon in the bath to the desired final carbon and adjusting the level of addition of oxygen and the addition of coolants to control the temperature at a desired level.

5. In the art of refining iron by blowing with oxygen-containing gas successive charges of known weight in the same vessel and storing data therefrom, the method of controlling a blow comprising the steps of storing values of bath carbon corresponding to values of carbon oxidation rate for a series of previous blows, continuously measuring the content of carbon and oxygen compounds in the waste gas per unit of time, continuously measuring the amount of oxygen blown per unit of time, continuously determining from the preceding two measurements the carbon oxidation rate by dividing the measured carbon content of the waste gas per unit of time by the amount of oxygen blown per unit of time, retrieving from storage values of bath carbon corresponding to the values of carbon oxidation rate so determined, thereby establishing the relation between bath carbon and carbon oxidation rate, determining the quantity of oxygen required to reduce a value of bath carbon so determined to the desired final value by integrating the relation between bath carbon and carbon oxidation rate from that value of bath carbon to the desired final value, and blowing the bath with that quantity of oxygen.

6. In the art of refining iron by blowing with oxygen-containing gas successive charges of known weight in the same vessel and storing data therefrom, the method of controlling a blow comprising the steps of storing values of bath carbon corresponding to values of carbon oxidation rate for a series of previous blows, continuously measuring the content of carbon and oxygen compounds in the waste gas per unit of time, continuously measuring the amount of oxygen blown per unit of time, continuously determining from the preceding two measurements the carbon oxidation rate by dividing the measured carbon content of the waste gas per unit of time by the amount of oxygen blown per unit of time, retrieving from storage values of bath carbon corresponding to the values of carbon oxidation rate so determined, thereby establishing the relation between bath carbon and carbon oxidation rate, determining the quantity of oxygen required to reduce a value of bath carbon so determined to the desired final value by integrating the relation between bath carbon and carbon oxidation rate from that value of bath carbon to the desired final value, measuring the temperature in the bath at a preselected point in the blow, determining the temperature rise resulting from feeding that quantity of oxygen, and simultaneously blowing the bath with that quantity of oxygen and adding a coolant sufficient to limit the temperature rise to a predetermined final temperature.

7. The method of dynamically controlling the refining of a bath of iron of known weight by blowing it with oxygen containing gas to provide a desired final carbon level comprising the steps of,
- (a) determining the parameters of carbon oxidation rate to percentage carbon for the furnace from a series of previous blows,
- (b) measuring the content of carbon and oxygen compounds in the waste gases for a given period of time,
- (c) measuring the rate of oxygen fed to the furnace for the same given period of time,
- (d) determining from the preceding two measurements (b) and (c) a carbon oxidation rate,
- (e) determining a percentage carbon value from said carbon oxidation rate and from the parameters of carbon oxidation rate to percentage carbon previously determined,
- (f) determining the approximate quantity of carbon in the bath at the end of said given period of time from said percentage carbon value and the known weight of said bath, and
- (g) feeding the quantity of oxygen required to reduce the carbon in the bath to the desired final carbon content.

8. The method of dynamically controlling the refining of a bath of iron of known weight by blowing it with oxygen containing gas to provide a desired final carbon and final temperature level comprising the steps of,
- (a) determining the parameters of carbon oxidation rate to percentage carbon for the furnace from a series of previous blows,
- (b) measuring the content of carbon and oxygen compounds in the waste gases for a given period of time,
- (c) measuring the rate of oxygen fed to the furnace for the same given period of time,
- (d) determining from the preceding two measurements (b) and (c) a carbon oxidation rate,
- (e) determining a percentage carbon value from said carbon oxidation rate and from the parameters of carbon oxidation rate to percentage carbon previously determined,
- (f) determining the approximate quantity of carbon in the bath at the end of said given period of time from said percentage carbon value and the known weight of said bath,
- (g) determining the amount of oxygen needed to reduce the carbon to a selected final carbon level,
- (h) determining the final temperature of the bath from the oxygen to be added, and
- (i) feeding the amount of oxygen so determined and adjusting the bath conditions to control the temperature.

References Cited

UNITED STATES PATENTS 3,100,699  8/1963  Von Bogdandy et al. ---- 75—60
3,236,630  2/1966  Stephan -------------- 75—60

BENJAMIN HENKIN, *Primary Examiner.*